United States Patent [19]

Lignelet

[11] Patent Number: 5,419,721
[45] Date of Patent: May 30, 1995

[54] ELECTRICAL CONNECTOR PROVIDED WITH A PLURALITY OF CONNECTION MODULES ARRANGED IN ROWS AND COLUMNS

[75] Inventor: Jacky Lignelet, Coudoux, France

[73] Assignee: Societe Anonyme dite: Eurocopter France, Marignance Cedex, France

[21] Appl. No.: 221,870

[22] Filed: Apr. 1, 1994

[30] Foreign Application Priority Data

Apr. 5, 1993 [FR] France ................ 93 03975

[51] Int. Cl.$^6$ ........................................ H01R 13/502
[52] U.S. Cl. ............................ 439/701; 439/364; 439/459; 439/905
[58] Field of Search ............ 439/359, 362, 364, 95–98, 439/108, 607, 610, 686, 695, 701, 731, 465, 466, 458, 459, 905

[56] References Cited

U.S. PATENT DOCUMENTS

| | | | |
|---|---|---|---|
| 3,447,036 | 5/1969 | Dore et al. | 439/364 X |
| 3,781,766 | 12/1973 | Teagno et al. | 439/731 X |
| 3,995,947 | 12/1976 | Lightner et al. | 439/364 |
| 4,123,629 | 10/1978 | Chagnon et al. | 439/364 X |
| 4,629,276 | 12/1986 | Genaro et al. | 439/459 X |
| 4,889,500 | 12/1989 | Lazar et al. | 439/364 X |
| 4,966,374 | 10/1990 | Oikawa et al. | 277/178 |
| 5,007,858 | 4/1991 | Daly et al. | 439/364 X |
| 5,066,251 | 11/1991 | Lundberg et al. | 439/701 |
| 5,074,808 | 12/1991 | Beamenderfer et al. | 439/606 |

FOREIGN PATENT DOCUMENTS

| | | |
|---|---|---|
| 1273388 | 9/1961 | France . |
| 3149060 | 6/1983 | Germany . |
| 3127867 | 8/1983 | Germany . |

*Primary Examiner*—Khiem Nguyen
*Attorney, Agent, or Firm*—Marshall, O'Toole, Gerstein, Murray & Borun

[57] ABSTRACT

Electrical connector including a module carrier (PM) and a wiring chamber which are adjacent. The connector includes several connection modules (MC) arranged in rows and in columns to give the module carrier (PM) an at least approximately square section. The wiring chamber consists of two shells (C1, C2) which can be joined together, as well as to the module carrier.

14 Claims, 9 Drawing Sheets

ELECTRICAL CONNECTOR PROVIDED WITH A PLURALITY OF CONNECTION MODULES ARRANGED IN ROWS AND COLUMNS present invention relates to an electrical connector provided with a plurality of connection modules arranged in rows and columns.

Electrical connectors which include a plurality of connection modules are already known, for example, from FR-A-2,115,556, FR-A-2,479,581, FR-A-2,489,609 and FR-A-2,501,428, which modules can be fitted onto a common support and through which pass connection members capable of establishing electrical connections between the front and rear faces of said modules, these faces being respectively opposite and facing said support. These prior documents describe various means for fixing each of said connection modules in the corresponding housing of said common support, as well as various embodiments for said connection members (male connector bodies and female connector bodies) which are preferably mounted in a removable way, (clipping-in), inside through-housings provided for this purpose in said modules.

Moreover, electrical connectors are found on the market, for example those under the DMC-M and DMC-MD references of the French company Compagnie DEUTSCH and under the SIM-N and SIM-D references of the French company AIR LB, which include a module carrier and a wiring chamber which are adjacent and made of aluminum alloy, said module carrier having a plurality of housings, generally four, into which may be inserted and held, for example by clipping-in, connection modules such as those described hereinabove. These modules form, for said connector, on the side opposite said wiring chamber, a plug-in face enabling said connector to be connected to a complementary electrical connector which is similar different, but which is provided with a complementary plug-in face, and, on the side facing said wiring chamber, a connection face for the ends (generally provided with connection end-fittings) of electrical conductors penetrating into said wiring chamber through the wall thereof, said modules being provided for this purpose with connection members (such as those described hereinabove) passing through them in order to ensure electrical connection between said plug-in face and said connection face.

In these known connectors, the four modules are aligned so that the module carrier and the wiring chamber have an elongate and flattened section. This results in connection difficulties when electrical conductors belonging to the same cable bundle have to be connected up to extreme modules. In addition, when such a connector is mounted on a partition or the like, it is necessary, in order to fix it, to provide an elongate and narrow opening of complementary shape, so that said partition is greatly weakened in the direction of the length of this opening. Furthermore, if the complementary connector is not perfectly aligned, this results in bending and/or torsional forces which risk causing deterioration of said connectors and of said partition because of the rigidity of said electrical conductor bundles. Moreover, as is usual, in order to lock the plug-in of said connector and of its complementary connector, said connector includes a central through-screw, the control head of which appears outside said wiring chamber and which is capable of being screwed into a complementary threaded bush. On account of the elongate and flattened section of said connector, it may be seen that the operating head of said locking screw lies between the conductor bundles and is therefore difficult to access. This operating head is virtually no longer accessible if the connector is arranged between other similar connectors. In addition, it should be pointed out that, on account of the flattened shape of the connector and of the rigidity of said conductor bundles, these are coplanar with said connector in the vicinity of said wiring chamber and can begin to be oriented in a different desired direction only from a fairly long distance from said connector. This therefore results in appreciable bulkiness behind said connector, and therefore in loss of available space, which is particularly detrimental in the case in which said connectors have to be loaded on board an aircraft, such as a helicopter or an aeroplane.

In a general way, in these known connectors, the module carrier and the wiring chamber are two different units fixed to each other by said locking through-screw and/or lateral press-screws. In addition, the wiring chamber is constituted by a flat casing closed off by a cover plate which is fixed to it by screws. This results in an appreciable number of screws (ten or so), so that the assembly of such a connector is lengthy (from 7 to 15 minutes). In addition, these screws are of small size and therefore fragile, and they risk causing damage to the conductors internal to said wiring chamber.

These known connectors, especially when they are intended to form part of the electrical circuits of an aircraft, are hardened, that is to say they are protected from electromagnetic interference, interference of the nuclear kind or otherwise, as well as from lightning and from spurious pickup from another on-board item of equipment. Thus, the disturbance and damage which could arise in the aircraft by the aforementioned causes, such disturbance and damage possibly even leading to the destruction of said aircraft, are avoided.

In order to harden such a connector, said module carrier and said wiring chamber are sealed with the aid of seals, especially between the modules and their housings in the module carrier and between said connection members and their housings in said modules, and ground continuity is provided between the various components. The structure of said known connectors does not allow systematic sealing and ground continuity at each joint.

In addition, still with the purpose of hardening the known connectors, ducts are provided for the conductor bundles to pass between said wiring chamber and the outside and said conductor bundles are covered with a conducting braid. It is thus possible to seal between the outside and the wiring chamber, by providing seals in said ducts, and to provide ground continuity between the conductors and the connector by connecting, for example with the aid of a metal collar, said braids of the conductor bundles to the corresponding ducts. Such ducts are simple cylindrical sleeves, of circular or oval section, made of conducting material, which project on the outside of said wiring chamber and which are either attached by screwing or made as a single piece with said wiring chamber.

Irrespective of the way in which they are fastened to said wiring chamber, it may be seen that these ducts further increase the rigidity proper of the cable bundles, so that they accentuate the drawbacks mentioned hereinabove, as regards the accessibility of the central locking screw and the excessive bulkiness at the rear of said wiring chamber.

It may be seen that the ducts, when they are fixed to the wiring chamber with the aid of screws, increase the time to mount the connectors, already lengthy as mentioned hereinabove. In addition, in order to secure the metal braid of a conductor bundle to the corresponding duct correctly, it is preferable to demount said duct. It is then therefore necessary to screw said duct back onto the wiring chamber, which is a tricky and lengthy operation because of the rigidity and the bulkiness of the conductor bundles provided with conducting braid and of the collars enabling said braid to be clamped onto the duct. Moreover, it often happens that the part of the conducting braid covering said duct is damaged while remounting a duct on the wiring chamber.

On account of the fact that, because of the elongate and flattened shape of the connector, it is not possible to connect up conductors of the same bundle to all the modules, it is necessary to provide several bundles and therefore several ducts. This means that, for a single connector, it is essential to carry out several lengthy and tricky operations to secure conducting braids to ducts, and therefore to anticipate a significant amount of time for mounting.

Finally, since these ducts are constituted by a monobloc sleeve, it is virtually impossible to automate the mounting of the end-fittings of the conductors in said modules.

The object of the present invention is to overcome these drawbacks of the known connectors and to describe a connector making it possible to comply with the strictest standards of international regulations, especially in the aeronautical field, as regards protection against external electromagnetic interference, as well as to enable said connector to be mounted onto electrical conductors automatically.

To this end, according to the invention, the electrical connector, including a module carrier and a wiring chamber which are adjacent, said module carrier having a plurality of connection modules which form, on the side opposite said wiring chamber, a plug-in face enabling said connector to be connected to an external complementary electrical connector, which is similar or different, but which is provided with a complementary plug-in face, and, on the side facing said wiring chamber, a connection face for the ends of electrical conductors penetrating into said wiring chamber, said modules being provided for this purpose with connection members passing through them in order to provide the electrical connection between said plug-in face and said connection face, is noteworthy:

in that said plurality of connection modules is arranged in rows and columns in order to give said module carrier, parallel to said plug-in face, an at least approximately square section; and in that said wiring chamber consists of two shells which can be joined together, as well as to said module carrier.

Thus the abovementioned drawbacks, relating to the elongated flattened shape of the known connectors, are overcome by virtue of the present invention.

As regards the more specific drawback due to the rigidity of the electrical conductors, it is possible to eliminate this to a large part by providing that at least the face of said wiring chamber, preferably the rear face carrying at least one duct, is oblique and oriented in the direction of said electrical conductors.

Thus, said conductors are preoriented at the outlet (or at the inlet) of said connector in accordance with the invention, which reduces their radius of curvature in the vicinity of said connector. In the case in which ducts solidly fastened to said wall of said wiring chamber are provided for said conductors to pass through, it is advantageous that said ducts consist of two half-ducts which can be joined together longitudinally and that said ducts are held rigidly fastened to said wiring chamber by trapping between said two joined shells.

In addition, on account of the at least substantially square shape of the section of the electrical connector, it may be seen that it is possible to decrease the number of ducts, and even to envisage providing just a single central duct.

Furthermore, by virtue of the structure in accordance with the invention, it is possible to arrange said shells and said ducts about the electrical conductors, after connecting these up to said module carrier, and to carry out easily the operations of connecting the conducting braids to the ducts (without having to slip these over the conductors before the connection to the module carrier) and of solidly fastening said ducts, thus connected to said conducting braids, to said shells.

Preferably, each half-duct is provided with a transverse base platelet, said platelets forming, after joining said half-ducts, transverse base plates for said ducts and slots are provided in the thickness of side walls of said shells, for example in the thickness of the rear walls, in order to serve as a housing for said transverse base plates.

Said half-ducts may have sections of any appropriate shapes, for example semicircular or U-shaped sections. In the latter case, the depths of the U's of two interacting half-ducts may be identical or different, so that it is possible to obtain any desired ovalization for the ducts.

In one advantageous embodiment, the electrical connector in accordance with the present invention includes at least one assembly of two associated ducts, in which each of said ducts is shaped, at its free end opposite said connector, with a flat, said associated ducts being adjoinable, one against the other, by their respective flats, in order to form an end sleeve, which is common, although internally divided by said flats, for the passage of said electrical conductors.

Thus, it is possible to arrange a single sheath as shielding around all the electrical conductors passing through said associated ducts. In addition, the use of branch-offs is avoided and a saving of hardware is produced (elimination of clamping collars, saving of copper braid, etc.). This therefore results in weight savings and a reduction in the time to mount said connector.

In the case of a connector including four connection modules, such an assembly of two associated ducts allows all the connections and optimizes the possibilities of use of said modules.

The free ends of said ducts are preferably semicylindrical, so that said common end sleeve is cylindrical.

Advantageously, in order to increase the sealing of said ducts, said half-ducts are joined along a longitudinal junction plane formed by interacting longitudinal shoulders. Thus, said junction plane forms transverse baffles opposing exchanges between the outside and the inside of the ducts.

It is also advantageous that the free edge of said side walls of said shells includes, plumb with said slots, curved cut-outs of shape corresponding to the external shape of said ducts, so that these curved cutouts match as closely as possible said ducts.

Advantageously, the module carrier includes, on the side of said wiring chamber, a frame surrounding said connection face and serving for the solid fastening of said shells to said module carrier. This frame may include a projecting peripheral rim capable of interacting with assembly slots provided in said shells. Thus the shells are mechanically fitted onto the module carrier.

Also for the purposes of good sealing of the wiring chamber, it is advantageous that said shells are joined along a junction plane formed by interacting longitudinal shoulders so as to form transverse baffles.

Screws may be provided for at least fixing said shells joined to each other.

The figures of the appended drawing will clearly explain how the invention may be realized. In these figures, identical references designate similar elements.

Figure 1:
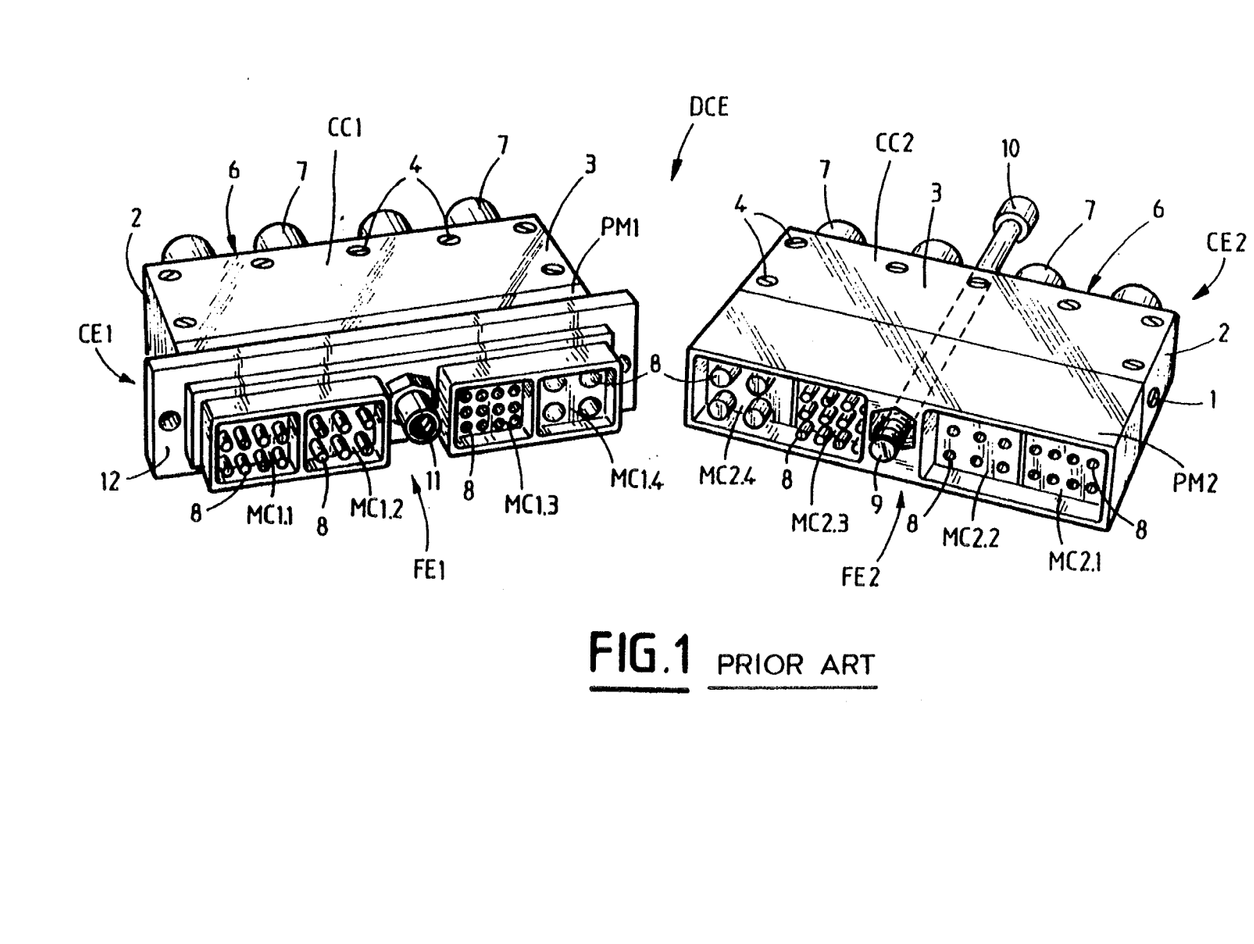
FIG. 1 shows, in perspective, two known complementary electrical connectors, not connected to each other.
Figure 2:
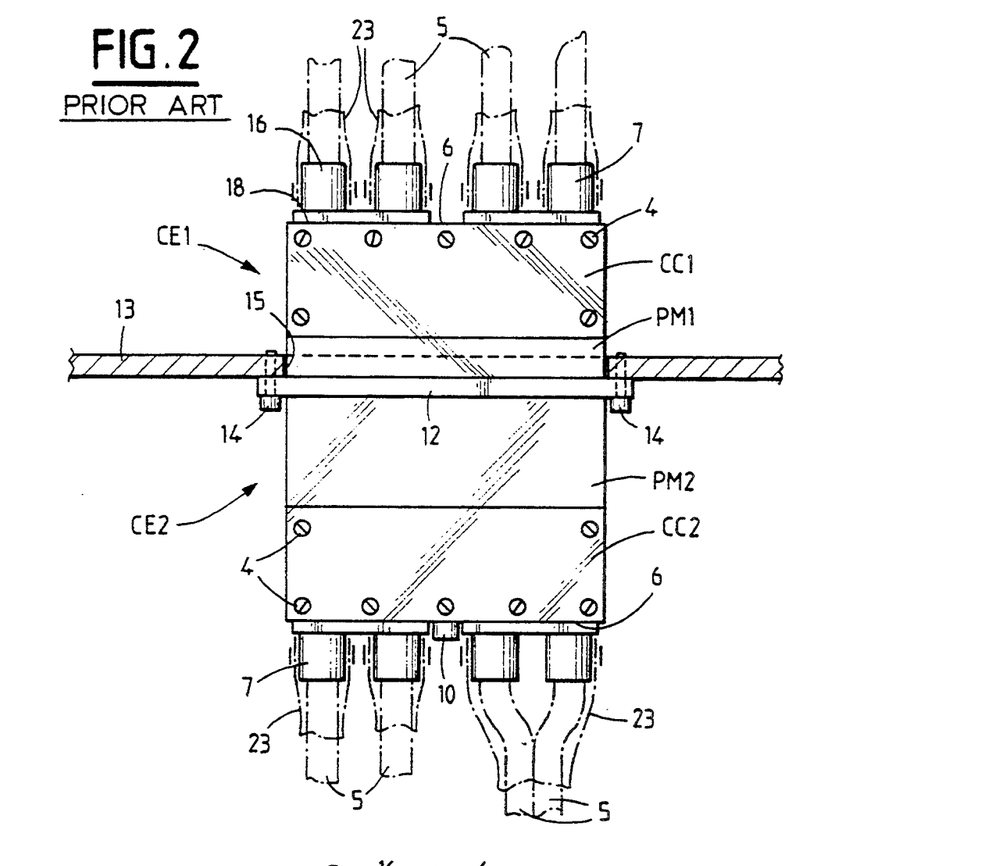
FIG. 2 illustrates, in plan view, the known connection device constituted by the two known electrical connectors of FIG. 1, connected to each other and mounted on a wall.

The known DCE electrical connection device, shown by FIGS. 1 and 2, includes two complementary electrical connectors CE1 and CE2. Each electrical connector CE1 or CE2 includes a module carrier PM1 or PM2, respectively, and a wiring chamber CC1 or CC2, respectively, these being made of an electrically conducting material (for example aluminum alloy).

The wiring chambers CC1 and CC2 each form a unit, which is attached to the corresponding electrical connector CE1 or CE2 by fitting and which is fixed thereto by lateral screws 1. Each wiring chamber CC1 or CC2 is formed by a casing 2 and a coverplate 3 fixed to said casing by a plurality of screws 4.

Each module carrier PM1 or PM2 has a plurality of housings into which respectively connection modules MC1.1 to MC1.4 and MC2.1 to MC2.4 are inserted and held. Said modules are fixed in the corresponding housings by any known means, but not shown, for example by clipping-in. The connection modules MC1.1 to MC1.4 of the electrical connector CE1 form, on the side opposite the wiring chamber CC1, a plug-in face FE1 complementary to the plug-in face FE2 formed, on the side opposite the wiring chamber CC2, by the connection modules MC2.1 to MC2.4 of the electrical connector CE2.

On the side of the wiring chambers CC1 and CC2, said connection modules MC1.1 to MC1.4 and MC2.1 to MC2.4 form connection faces (not visible in FIGS. 1 and 2) for the ends of electrical conductors 5.

In the electrical connectors CE1 and CE2, the connection modules MC1.1 to MC1.4 and MC2.1 to MC2.4 are arranged in line, so that each of said electrical connectors has a flattened shape, which is elongate in the direction of the alignment of said connection modules.

The electrical conductors 5 penetrate into the wiring chambers CC1 and CC2, via the corresponding elongate rear face 6 of these, said face being opposite the plug-in face FE1 or FE2, through conducting ducts 7, fixed to said elongate faces 6.

Each connection module MC1.1 to MC1.4 and MC2.1 to MC2.4 is provided with connection members 8, for example male- and female-type pins passing through them, which are intended to provide the electrical continuity between the connection faces (not visible as they are arranged on the side of the wiring chambers and to which faces the ends of the conductors 5 are connected) and the corresponding plug-in faces FE1 and FE2, as well as between said plug-in faces FE1 and FE2, when said electrical connectors CE1 and CE2 are mated (see FIG. 2).

In order to lock said electrical connectors CE1 and CE2 in the mated position, provision is made for a through-screw 9 held captive on the electrical connector CE2 and provided with an operating head 10, capable of interacting with a threaded bush 11, solidly fastened to the electrical connector CE1. The module carrier PM1 of the latter may include a flange 12 enabling it to be fixed to a wall 13 with the aid of screws 14, at the periphery of an opening 15 into which said electrical connector CE1 is engaged.

Figure 3:
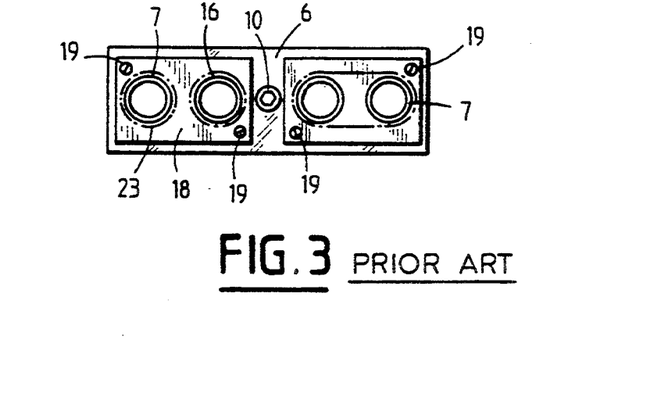
FIG. 3 is an end view of the rear face of said known connectors of FIG. 1.
Figure 4:
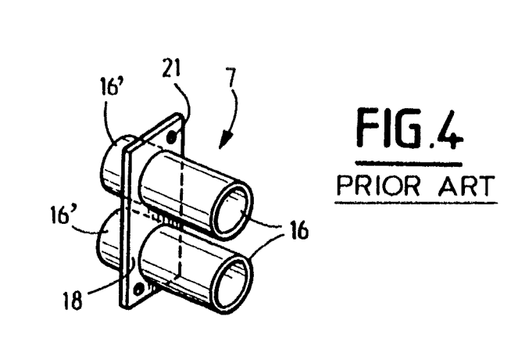
FIGS. 4 and 6 illustrate, in perspective, two known embodiments for the ducts for passage of the electrical conductors.

As FIGS. 2 and 3, and more clearly FIGS. 4 to 7, show, the ducts 7 of the known electrical connectors CE1 and CE2 are constituted by sleeves 16 or 17, of cylindrical or oval section, solidly fastened to transverse base plates 18, which can be fixed to the rear faces 6 of the electrical connectors CE1 and CE2 by virtue of the screws 19. In the embodiment of FIG. 4, two cylindrical sleeves 16, through each of which a conductor 5 bundle (for example a cable) may pass, are solidly fastened to a common base plate 18. Of course, each cylindrical sleeve 16 may be provided with its own base plate. Each cylindrical sleeve 16 passes through the plate 18 and has a prolongation 16' capable of penetrating inside passages 20, provided in said rear faces 6, for the passage of the conductors 5 (see FIG. 7). (Threaded) holes 21 and 22 are respectively provided in the bases 18 and in the rear faces 6 for said fixing screws 19.

Figure 6:
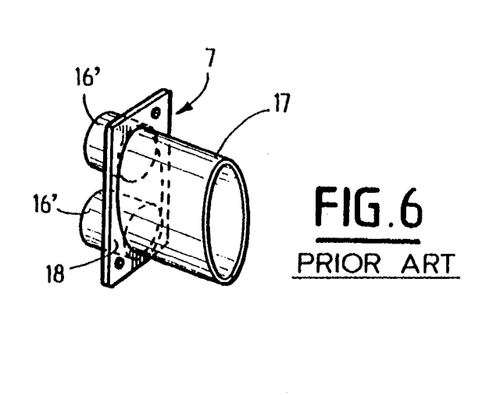

In the embodiment, also known, of FIG. 6, the two cylindrical sleeves 16 of FIG. 4 are replaced by a single sleeve 17, of oval section, for the passage of two conductor 5 bundles, said sleeve 17 being prolonged, on the opposite side of the plate 18, by two prolongations 16', like those described previously.

Figure 5:
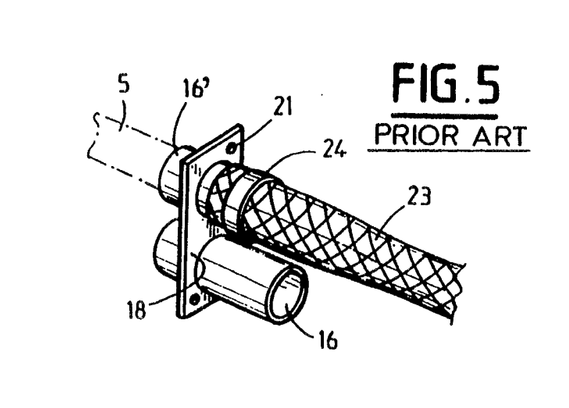
FIGS. 5 and 7 illustrate, respectively, also in perspective, the ground connection between said ducts of FIGS. 4 and 6 and the metal braids surrounding the electrical conductors connected to said known connectors.
Figure 7:
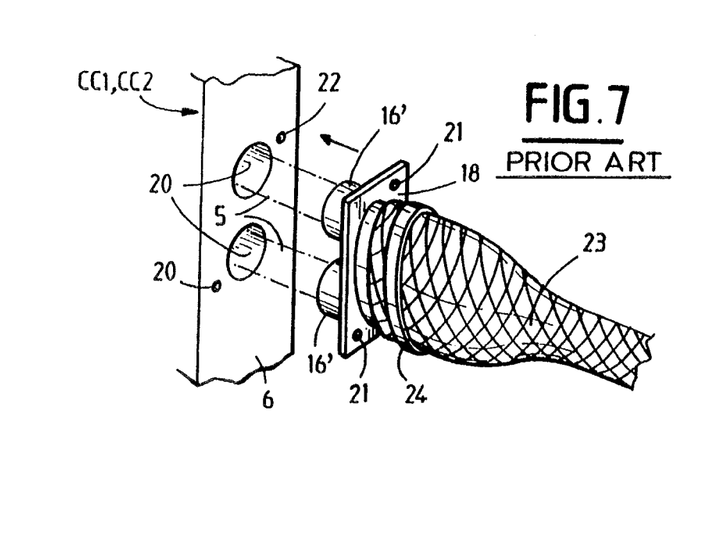

As has been described hereinabove and is shown in FIGS. 2, 5 and 7 in order to provide the ground continuity, the electrical conductors 5 are surrounded by conducting braids 23, held in electrical contact with said ducts 7 by clamping collars 24, said conducting braids 23 and said clamping collars 24, for reasons of convenience, having to be solidly fastened to said ducts 7 before finally mounting the latter onto said wiring chambers CC1 and CC2.

From the previous description, with regard to FIGS. 1 to 7, (which has intentionally omitted the various seals, since they are well known in the art), it is found that it is virtually impossible to automate the mounting of the electrical connectors CE1 and CE2 onto the ends of conductors, because of the design of the wiring chambers CC1 and CC2 (large number of screws 4 for fixing the coverplates 3 onto the casings 2), of the design of the ducts 7 (which have to be slipped over the conductors 5) and of the way of fixing said ducts 7 to the connectors CE1 and CE2 by screwing.

In order to overcome this drawback, the electrical connector CE according to the invention (intended to replace one or other of said known connectors CE1 and CE2 described hereinabove) essentially includes (see FIGS. 8 to 11):

two shells C1 and C2 which are locked by screws 25 and intended to form a wiring chamber CC (comparable to the wiring chambers CC1 and CC2) and which can be joined together along a junction plane PJ, as well as to the module carrier PM (comparable to the module carriers PM1 and PM2), on the side opposite the plug-in face FE of the latter;

ducts CH which are intended to replace the ducts 7 and are held solidly fastened to the wiring chamber CC by being held captive between the shells C1 and C2.

In addition, in the connector CE in accordance with the invention, the four connection modules MC (of which each of them represents a module MC1.1 to MC1.4 or MC2.1 to MC2.4) are arranged in rows and columns (of two modules each) around the screw 9 or around the bush 11, so that the module carrier PM has an at least approximately square section.

Figure 8:
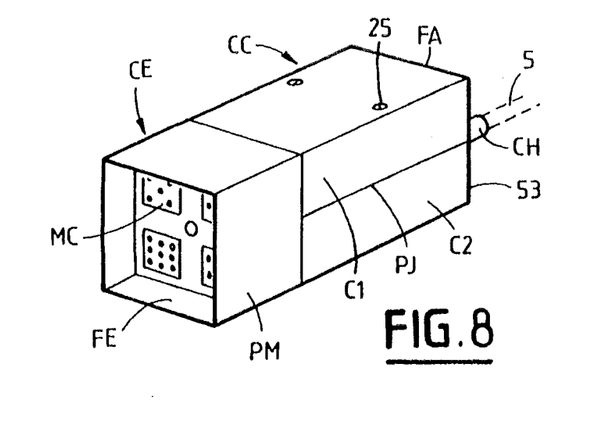
FIGS. 8, 9, 10 to 11 are views, in diagrammatic perspective, of examples of connectors in accordance with the present invention.
Figure 9:
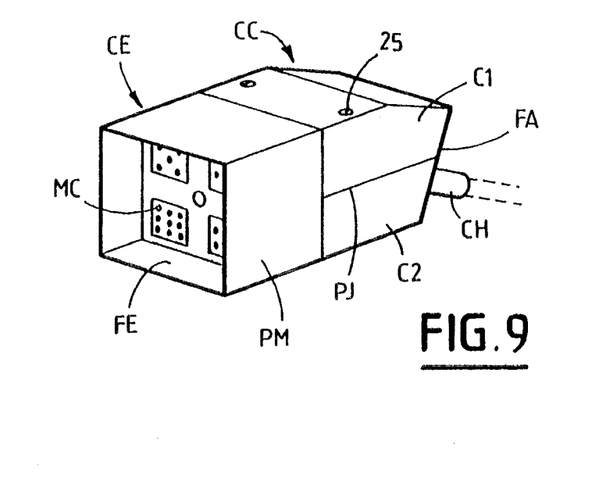
Figure 10:
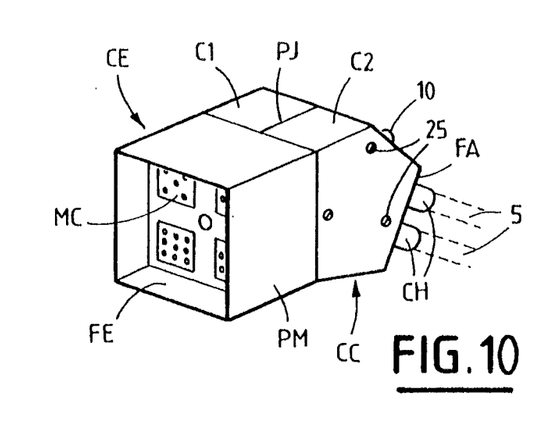
Figure 11:
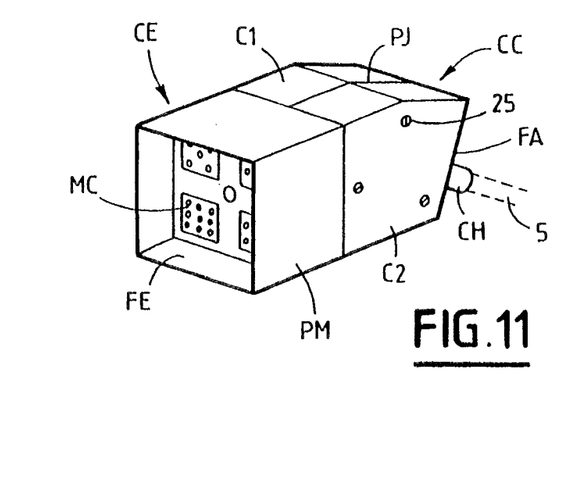

In FIGS. 8 and 9, the junction plane PJ is horizontal, whereas in FIGS. 10 and 11, it is vertical.

In the exemplary embodiment of FIG. 8, the rear face FA of the wiring chamber, carrying the duct or ducts CH is straight, parallel to the plug-in face FE of the connector, whereas, in the exemplary embodiments of FIGS. 9, 10 and 11, said rear face is oblique, in order to orient the ducts CH in the direction of the electrical conductors 5.

According to an important feature of the present invention, the conducting ducts CH consist of two half-ducts 30 which can be joined longitudinally.

Figure 12:
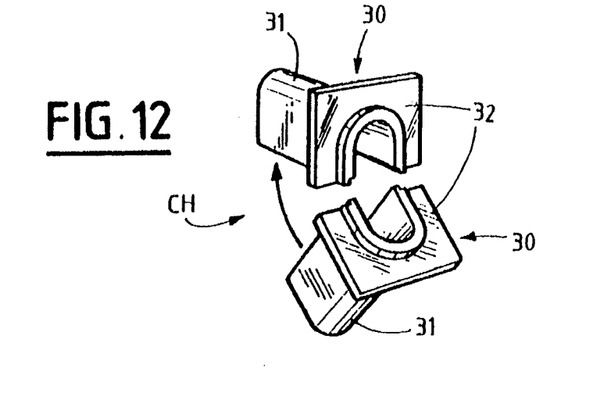
FIGS. 12, 13, 14 and 15 illustrate embodiments of ducts, in accordance with the present invention.
Figure 13:
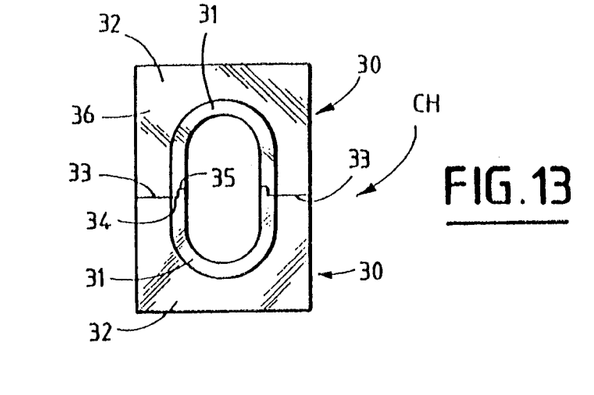

In the exemplary embodiment illustrated by FIGS. 12 and 13, each half-duct 30 consists of a part in the form of a channel 31, associated with a base part 32. The two parts in the form of channels 31 of the half-ducts 30 may have a semicircular section or (as shown) a U-shaped section. In this latter case, the U's may be identical or different, as regards their depth. The base parts 32 are in the form of rectangular platelets surrounding the convex part of said channels 31. The two half-ducts 30 can be joined longitudinally along a junction plane 33 which, preferably, as shown, is not flat, but includes interacting shoulders 34 and 35 capable of forming transverse baffles. Thus, better sealing of the ducts is obtained.

In FIG. 12, the duct CH is shown in exploded perspective view, whereas in FIG. 13, the duct CH is shown in end view, joined up.

In this joined-up position, the two platelets 32 form a base plate 36.

Figure 14:
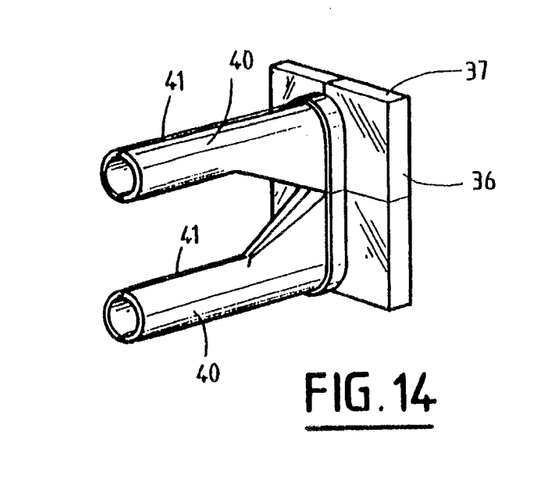

Numerous embodiment variants may be provided for the conducting ducts CH. For example, FIG. 14 shows, in perspective, an example of the system having two circular channels 40, each channel being formed, as previously, by two half-channels joined longitudinally along junction planes 41. In this case, the base plate 36 is formed by four joined base parts 37.

Figure 15:
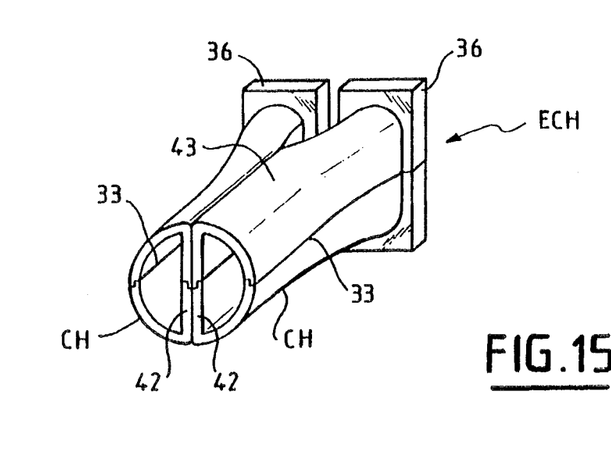

As regards FIG. 15, this illustrates an assembly of ducts ECH in the form of trousers, including two identical associated ducts CH, of varying section. On the side opposite their base plate 36, each of the ducts CH has a section provided with a flat 42 and the two ducts are shaped so as to be able to be adjoined along their flats 42, while their base plates 36 are coplanar. As previously, each duct CH is composed of two half-ducts which can be joined along the junction planes 33.

Thus, on the side opposite the coplanar base plates 36, the assembly ECH of the associated ducts has an end sleeve 43, divided internally and longitudinally by the adjoined flats 42.

In the example shown, the end sleeve 43 is cylindrical, since the free ends of each of said ducts CH are semicylindrical (each half-duct having an end section in the form of a quadrant of a circle).

Thus it may be seen that the two associated ducts of the assembly ECH have a common sleeve 43, divided internally, for the passage of the electrical conductors.

Figure 16:
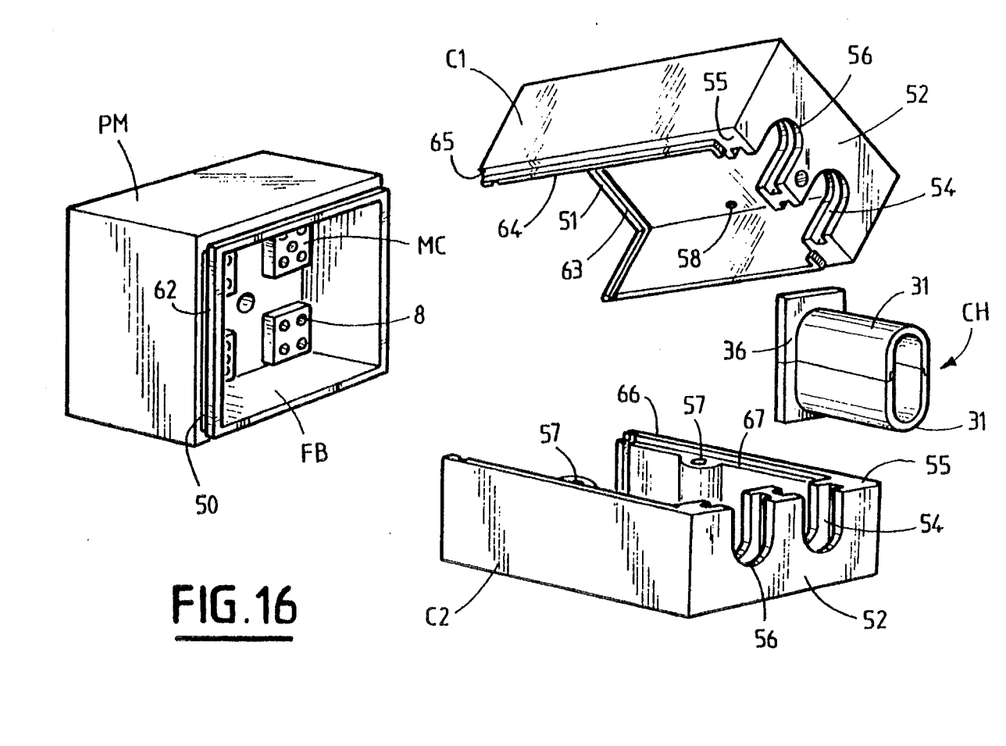
FIGS. 16 and 17 are exploded views, in perspective, of the main elements of two embodiments of the connector in accordance with the present invention.

In the exemplary embodiment of the connector in accordance with the invention, illustrated by FIG. 16 (which corresponds to that shown mounted in FIG. 8), the module carrier PM includes, around its connection face FB, a frame 50 provided with a projecting peripheral rim 62. On the side facing the module carrier PM, each of the shells C1 and C2 has a bearing surface 51 provided with a groove 63 and intended to be applied against the frame 50, thereby trapping the projecting peripheral rim 62 in said grooves 63.

On the side opposite the module carrier PM, each of the shells C1 and C2 includes a thick rear side wall 52, the two rear walls 52 being intended to form, for the connector CE, a rear wall 53 comparable to the rear wall 6 described hereinabove with regard to FIGS. 2 and 3. Slots 54 are made in the thickness of the rear side walls 52, these slots being intended to serve as a housing for base plates 36 of the duct CH (only one of which is shown). The free edges 55 of the rear walls 52 are cut out with a curve (at 56) plumb with the slots 54, so as to match the shape of the channels 31.

The friction between the base plates 36 and the walls of the slots 54 is capable of providing the electrical contact between the ducts CH and the shells C1 and C2.

It may easily imagined that, by virtue of the construction of the connector according to the invention, the shells C1 and C2 may be joined together, as well as to the module carrier PM, thereby trapping the ducts CH between them. For example, threaded holes 57 in the shell C2 are provided for the various screws 25 which pass through the holes 58 of the shell C1 and are intended to fix, between them, the various elements PM, C1, C2 and CH.

The junction plane PJ includes interacting fitting shoulders 64 to 67, respectively provided on said shells C1 and C2.

Figure 17:
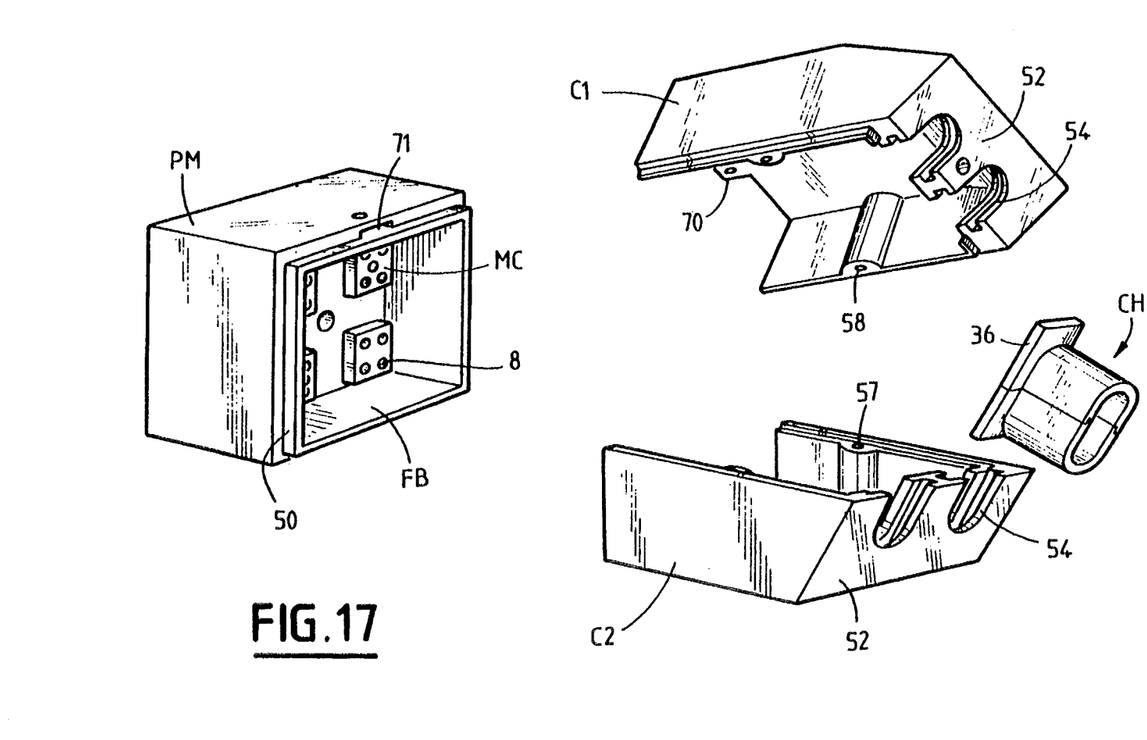

In the embodiment variant of FIG. 17 (which corresponds to that of FIG. 9), the elements of the connector of FIG. 16 are, for the most part, encountered again. However, in this case, the frame 50 does not include a projecting peripheral rim 62, so that the bearing surfaces 51 are planar. Additional fixing means may be provided between the elements PM, C1 and C2, for example a tongue 70 on the shell C1, capable of penetrating into the slot 71 of the module carrier PM and of being fixed therein by screws.

In this case, the rear faces 52 of the shells C1 and C2 are oblique.

Figure 18:
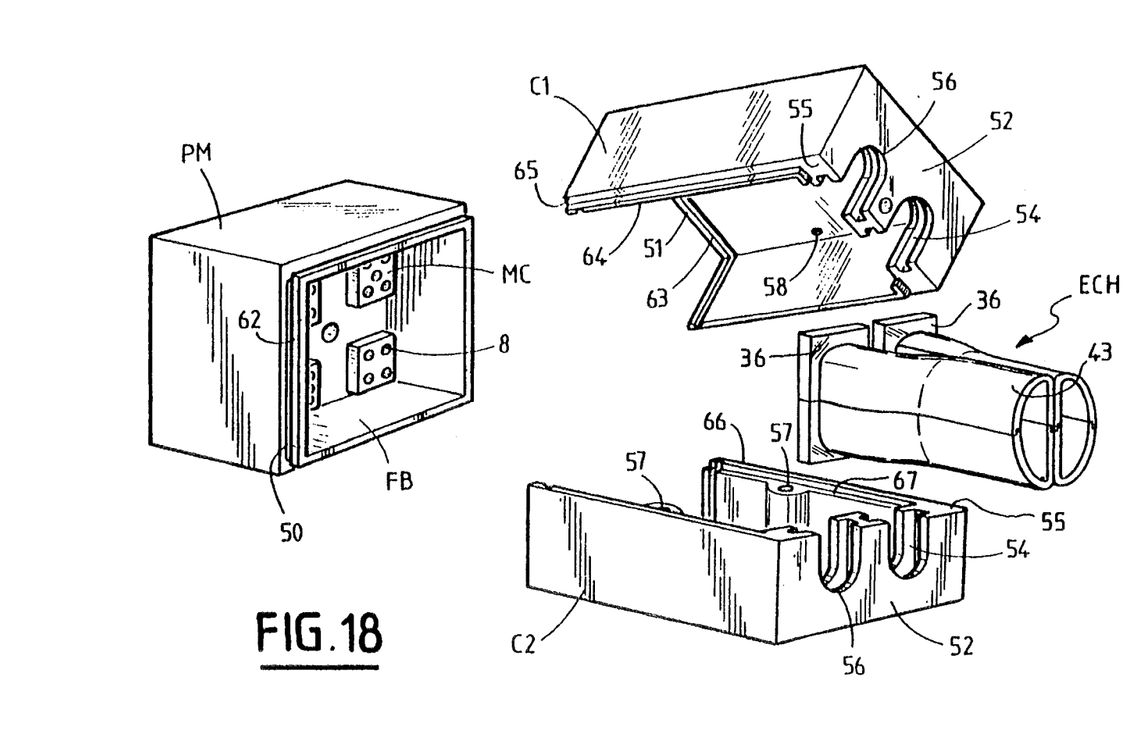
FIGS. 18 and 19 correspond respectively to the embodiments of FIGS. 16 and 17, equipped with the ducts of FIG. 15.
Figure 19:
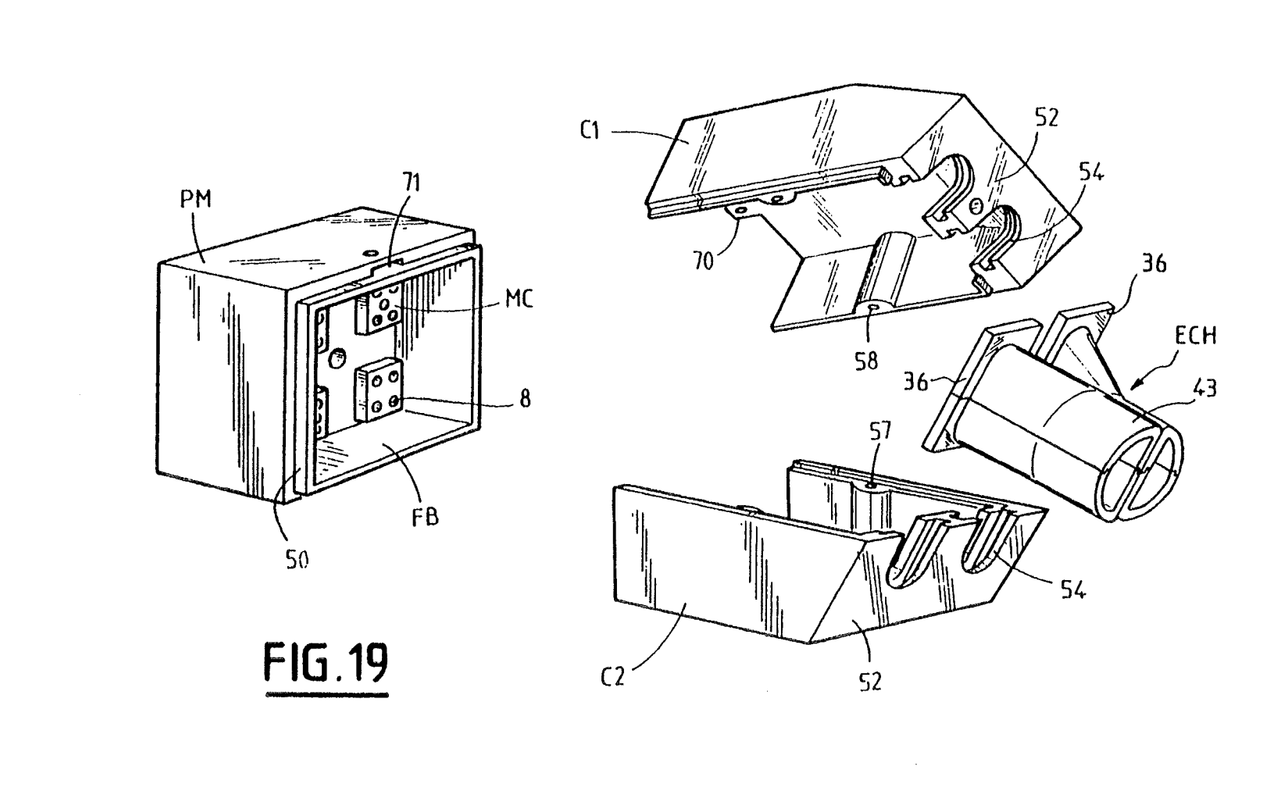

FIGS. 18 and 19 correspond respectively to FIGS. 16 and 17. However, the ducts CH (in accordance with FIGS. 12 and 13) are replaced here by the assembly ECH of FIG. 15. The shells C1 and C2 include two pairs of slots 54 for the reception of the two base plates 36 of the assembly ECH.

In FIGS. 16 to 19, the various known seals, enabling the connector to be sealed, have not been shown. It may easily be imagined that, by virtue of the structure of the connector in accordance with the present invention, it is possible to automate the mounting of the latter onto the ends of conductors 5. In fact, having dismantled the connector, it is easy to connect said ends of conductors to the connection members 8 of the module carrier PM, on the side of the connection face FB and then to enclose said conductors in the wiring chamber CC and to provide the ground connection between the conducting braids 23 and the ducts CH, by bringing the ducts CH and the shells C1 and C2 back around said conductors.

I claim:

1. An electrical connector comprising:
    a module carrier having a plurality of connection modules, which form a front plug-in face enabling said connector to be connected to a complementary electrical connector and a rear connection face for the ends of electrical conductors, said modules being provided with connection members passing through said modules in order to provide the electrical connection between said front plug-in face and said rear connection face, said plurality of connection modules being arranged in rows and in columns in order to give said module carrier, parallel to said front plug-in face, an at least approximately square section;
    a wiring chamber adjacent said module carrier on the side of said rear connection face, said wiring chamber consisting of two shells which can be joined by fastening means;
    ducts surrounding electrical conductors penetrating into said wiring chamber through a wall of said wiring chamber, said ducts consisting of two half-ducts which can be joined longitudinally;
    said fastening means, when joining said two shells together, simultaneously acting for:
    (a) solidly fastening said shells to said module carrier;
    (b) solidly fastening together said two half-ducts of each duct; and
    (c) solidly fastening said ducts to said wiring chamber, said ducts being trapped between said joined shells.

2. The electrical connector as claimed in claim 1, wherein the wall of said wiring chamber, through which said electrical conductors penetrate, is oblique and oriented in the direction of said conductors.

3. The electrical connector as claimed in claim 1, in which ducts are provided surrounding said electrical conductors and solidly fastened to the wall of said wiring chamber through which said conductors penetrate into said chamber, wherein:
    said ducts consist of two half-ducts which can be joined longitudinally; and
    said ducts are held solidly fastened to said wiring chamber by being held trapped between said joined shells.

4. The electrical connector as claimed in claim 3, wherein each half-duct is provided with a transverse base platelet, wherein said transverse base platelets form, after joining said half-ducts, transverse base plates for said ducts and wherein slots are provided in the thickness of side walls of said shells in order to serve as a housing for said transverse base plates.

5. The electrical connector as claimed in claim 3, wherein each half-duct has a semicircular section.

6. The electrical connector as claimed in claim 3, wherein each half-duct has a U-shaped section.

7. The electrical connector as claimed in claim 3, wherein it includes at least one assembly (ECH) of two associated ducts, in which each of said ducts is shaped, at its free end opposite said connector, with a flat, said associated ducts being adjoinable, one against the other, by their respective flats, in order to form an end sleeve, which is common, although internally divided by said flats, for the passage of said electrical conductors.

8. The electrical connector as claimed in claim 7, wherein said free ends of said ducts are semicylindrical, so that said common end sleeve is cylindrical.

9. The electrical connector as claimed in claim 3, wherein said half-ducts are joined along a longitudinal junction plane formed by interacting longitudinal shoulders on said half-ducts.

10. The electrical connector as claimed in claim 4, wherein the free edge of said side walls of said shells includes, plumb with said slots, curved cut-outs of shape corresponding to the external shape of said ducts.

11. The electrical connector as claimed in claim 1, wherein said module carrier includes, on the side of said wiring chamber, a frame surrounding said connection face and serving for the solid fastening of said shells to said module carrier.

12. The electrical connector as claimed in claim 11, wherein said frame includes a projecting peripheral rim, capable of interacting with assembly slots provided in said shells.

13. The electrical connector as claimed in claim 1, wherein said shells are joined along a junction plane formed by interacting longitudinal shoulders on said shells.

14. The electrical connector as claimed in claim 1, wherein at least its joined shells are fixed to each other by screws.

* * * * *

UNITED STATES PATENT AND TRADEMARK OFFICE
CERTIFICATE OF CORRECTION

PATENT NO. : 5,419,721
DATED : May 30, 1995
INVENTOR(S) : JACKY LIGNELET

It is certified that error appears in the above-identified patent and that said Letters Patent is hereby corrected as shown below:

Column 1, line 6, "present invention" should be --The present invention--.

Column 1, line 38, "similar different," should be --similar or different,--.

Signed and Sealed this

Twenty-sixth Day of December, 1995

Attest:

BRUCE LEHMAN

*Attesting Officer*     *Commissioner of Patents and Trademarks*